United States Patent
Xue

(10) Patent No.: US 10,541,899 B2
(45) Date of Patent: Jan. 21, 2020

(54) DATA PACKET SENDING METHOD AND APPARATUS IN IPV6 NETWORK

(71) Applicant: Huawei Technologies Co., Ltd., Shenzhen (CN)

(72) Inventor: Wan Xue, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/906,680

(22) Filed: Feb. 27, 2018

(65) Prior Publication Data
US 2018/0205629 A1 Jul. 19, 2018

Related U.S. Application Data

(63) Continuation of application No. PCT/CN2015/088693, filed on Aug. 31, 2015.

(51) Int. Cl.
*H04L 12/26* (2006.01)
*H04L 12/749* (2013.01)
(Continued)

(52) U.S. Cl.
CPC .......... *H04L 43/10* (2013.01); *H04L 45/741* (2013.01); *H04L 47/36* (2013.01); *H04L 45/02* (2013.01)

(58) Field of Classification Search
CPC ......... H04L 29/06; H04L 43/10; H04L 45/02; H04L 45/741; H04L 47/36; H04L 47/365; H04L 69/166; H04W 28/065
See application file for complete search history.

(56) References Cited

U.S. PATENT DOCUMENTS

| 2010/0208613 A1 | 8/2010 | Oba et al. |
| 2012/0051236 A1* | 3/2012 | Hegde .................... H04L 43/10 370/252 |

(Continued)

FOREIGN PATENT DOCUMENTS

| CN | 1909503 A | 2/2007 |
| CN | 101022419 A | 8/2007 |

(Continued)

OTHER PUBLICATIONS

Cheng et al.,"A PMTU discovery mechanism based on routing protocol in IPv6 network," Computer Engineering and Science,vol. 35, No. 2, China Academic Journal Electronic Publishing House (Feb. 2013).

(Continued)

*Primary Examiner* — Awet Haile
(74) *Attorney, Agent, or Firm* — Leydig, Voit & Mayer, Ltd.

(57) ABSTRACT

The present invention relates to the field of communications technologies, and in particular, to a data packet sending method and apparatus in an Internet Protocol IP version v6 network, so as to resolve a problem that a data packet may be always discarded before a PMTU of a path is probed in a current IPv6 network. The method includes: before a PMTU of a path is probed, sending a data packet according to a minimum MTU stipulated in the IPv6 protocol; and after the PMTU of the path is probed, sending a subsequent data packet on the path according to the probed PMTU of the path. The method ensures that the data packet can pass through a network device having any MTU on the path, so as to ensure that the data packet can be received by a destination receive end.

20 Claims, 9 Drawing Sheets

(51) Int. Cl.
*H04L 12/805* (2013.01)
*H04L 12/751* (2013.01)

(56) References Cited

U.S. PATENT DOCUMENTS

2016/0007398 A1\* 1/2016 Choi ........................ H04W 4/80
370/310
2017/0331755 A1\* 11/2017 Gao ........................ H04L 12/413

FOREIGN PATENT DOCUMENTS

| | | |
|---|---|---|
| CN | 101150520 A | 3/2008 |
| CN | 101252524 A | 8/2008 |
| CN | 102317801 A | 1/2012 |
| CN | 102325076 A | 1/2012 |
| JP | 2012518348 A | 8/2012 |
| JP | 2013110689 A | 6/2013 |
| WO | 2009124477 A1 | 10/2009 |
| WO | 2013120416 A1 | 8/2013 |

OTHER PUBLICATIONS

Huang et al.,"A Hierarchical Path MTU Discovery Method Based on Empiristic Data", ACTA Electronica Sinica, vol. 35,No. 10, (Oct. 2007).

\* cited by examiner

DATA PACKET SENDING METHOD AND APPARATUS IN IPV6 NETWORK

CROSS-REFERENCE TO RELATED APPLICATIONS

This application is a continuation of International Application No. PCT/CN2015/088693, filed on Aug. 31, 2015, the disclosure of which is hereby incorporated by reference in its entirety.

TECHNICAL FIELD

The present invention relates to the field of communications technologies, and in particular, to a data packet sending method and apparatus in an IPv6 network.

BACKGROUND

In an Internet Protocol version 6 (Internet Protocol version 6, IPv6) network, to improve forwarding efficiency of a network device, an intermediate device such as a router no longer has a fragmentation function, and a data packet whose length exceeds a length of a maximum transmission unit (Maximum Transmission, MTU) on an interface of this device is directly discarded. Therefore, a fragment reassembly function of the data packet can only be completed on a host (HOST) node at a transmit end. In other words, only the host node at the transmit end can perform fragmentation on the data packet. Therefore, the host node at the transmit end needs to probe a path maximum transmission unit (Path Max Transmission Unit, PMTU) of a path, to determine a length of a sent data packet.

A current data packet sending process is shown in FIG. 1. The host node at the transmit end uses an egress interface to send a data packet, and an MTU preconfigured on the egress interface is 1500 bytes. When sending a data packet, the host node at the transmit end sends the data packet according to the preconfigured MTU that is 1500 bytes.

After receiving the data packet sent by the transmit end, a router A determines that an MTU configured on an interface for sending the data packet by the router A is 1400 bytes. Therefore, after receiving the data packet whose MTU is 1500 bytes, the router A discards the data packet, sends a message of an Internet Control Message Protocol (internet control message protocol, ICMP) version (version, v) 6 (type=2) to the transmit end to indicate that the received data packet is excessively long, and adds information indicating that the MTU is 1400 bytes to the message.

After receiving the message, the transmit end subsequently sends a data packet whose MTU is 1400 bytes on the path according to the information indicating that the MTU is 1400 bytes in the message.

The subsequent data packet arrives at a router B after passing through the router A. After receiving the data packet whose MTU is 1400 bytes, the router B determines that an MTU configured on an interface used to send the data packet by the router B is 1300 bytes, and therefore, the router B discards the received data packet whose MTU is 1400 bytes, returns the message of ICMPv6 (type=2) to the transmit end to indicate that the received data packet is excessively long, and adds information that indicates that the MTU is 1300 bytes to the message.

After receiving the message, the transmit end subsequently sends a data packet whose MTU is 1300 bytes according to the information indicating that the MTU is 1300 bytes in the message. The data packet whose MTU is 1300 bytes may arrive at a destination node after separately passing through the router A and the router B.

It can be learned from the process shown in FIG. 1 that, the data packet whose MTU is 1500 bytes and the data packet whose MTU is 1400 bytes that are sent by the transmit end are respectively discarded by the router A and the router B. That is, before the transmit end probes a PMTU that is 1300 bytes of a path, all sent data packets are discarded.

In conclusion, in the current IPv6 network, it is possible that because a length of a sent data packet exceeds an MTU length supported by an interface of a network device on a path, the data packet is always discarded before a PMTU of the path is probed by a data packet transmit end.

SUMMARY

In view of this, embodiments of the present invention provide a data packet sending method and apparatus in an IPv6 network, so as to resolve a problem that a data packet may be always discarded before a PMTU of a path is probed by a data packet transmit end in a current IPv6 network.

According to a first aspect, an embodiment of the present invention provides a data packet sending method in an Internet Protocol version 6 (IPv6) network, including:

before a PMTU of the path is probed, sending a data packet on the path according to a minimum MTU stipulated in the IPv6 protocol; and after the PMTU of the path is probed, sending a subsequent data packet on the path according to the probed PMTU of the path.

Optionally, before the sending a data packet on the path according to a minimum MTU stipulated in the IPv6 protocol, the method further includes:

determining that a path maximum transmission unit PMTU that is of a path and that is used by a to-be-sent data packet is unknown; and sending the to-be-sent data packet according to the minimum maximum transmission unit MTU stipulated in the IPv6 protocol, and performing PMTU probing on the path.

With reference to the first aspect, in a first possible implementation, determining that the PMTU of the path is unknown when at least one of the following conditions is met:

the to-be-sent data packet is a data packet first sent on the path by a current host (HOST);

a PMTU entry that is of the path and that is on a current host is deleted;

a current host is probing the PMTU of the path; or a current host receives an indication message sent by a network device on the path, where the indication message is used to indicate that a packet received on the path by the network device is excessively long.

With reference to the first aspect or the first possible implementation of the first aspect, in a second possible implementation, the performing PMTU probing on the path includes:

constructing a probe packet by using a source IP address and a destination IP address of the to-be-sent data packet, and sending the probe packet on the path;

determining whether the sent probe packet is received by a destination receive end of the to-be-sent data packet; and if it is determined that the probe packet is received by the destination receive end, using a maximum MTU used in the probe packet received by the destination receive end as a probed PMTU of the path.

With reference to the second possible implementation of the first aspect, in a third possible implementation, after the determining whether the sent probe packet is received by a destination receive end of the to-be-sent data packet, the method further includes:

if it is determined that the probe packet is not received by the destination receive end, determining whether the indication message sent by the network device on the path is received, where the indication message is used to indicate that a packet received on the path by the network device is excessively long;

if the indication message is received, repeatedly performing a first operation, until the probe packet is received by the destination receive end of the to-be-sent data packet, or until the probe packet is sent for N consecutive times but the indication message is not received and it cannot be determined that the probe packet is received by the destination receive end, where N is a positive integer, where the first operation includes: obtaining an MTU supported by the network device from the indication message, and sending the probe packet again according to the obtained MTU; and if the probe packet is received by the destination receive end of the to-be-sent data packet, using the maximum MTU used in the probe packet received by the destination receive end as the probed PMTU of the path.

With reference to the third possible implementation of the first aspect, in a fourth possible implementation, the performing PMTU probing on the path further includes:

if the probe packet is sent for N consecutive times but the indication message is not received and it cannot be determined that the probe packet is received by the destination receive end, repeatedly performing a second operation, until the indication message is received or the probe packet is received by the destination receive end; and the second operation includes: setting a first MTU, and sending the probe packet by using the specified first MTU, where a length of the first MTU is not less than a length of the minimum MTU stipulated in the IPv6 protocol, and if the indication message is received, the length of the first MTU is not greater than a minimum value among a length of a second MTU, a length of a third MTU, and a length of an MTU indicated in the received indication message; or if the indication message is not received, the length of the first MTU is not greater than a smaller value of a length of a second MTU and a length of a third MTU;

the second MTU is an MTU configured on a specific interface of the current host, the third MTU is an MTU indicated in a router advertisement (RA) packet that is received by the current host from the specific interface, and the specific interface is an egress interface used to send the to-be-sent data packet by the current host;

if in a process of repeatedly performing the second operation, it is determined that the probe packet is received by the destination receive end of the to-be-sent data packet, using the maximum MTU used in the probe packet received by the destination receive end as the probed PMTU of the path; and if the indication message is received in the process of repeatedly performing the second operation, returning to repeatedly perform the first operation, until the probe packet is received by the destination receive end of the to-be-sent data packet, or until the probe packet is sent for N consecutive times but the indication message is not received and it cannot be determined that the probe packet is received by the destination receive end.

With reference to any one of the second to the fourth possible implementations of the first aspect, in a fifth possible implementation, the probe packet is a transport layer protocol packet, where a destination port number of the probe packet is a port number that is not used by the destination receive end, and the performing PMTU probing on the path includes: after the sending the probe packet on the path, if a peer end unreachable packet is received, determining that the probe packet is received by the destination receive end; or the probe packet is a ping packet, and the performing PMTU probing on the path includes: after the sending the probe packet on the path, if a response of the destination receive end is received, determining that the probe packet is received by the destination receive end; or the probe packet is a trace route trace route packet, and the performing PMTU probing on the path includes: after the sending the probe packet on the path, if a response of the destination receive end is received, determining that the probe packet is received by the destination receive end; or the probe packet is a protocol packet over a transport layer, and the performing PMTU probing on the path includes: after the sending the probe packet on the path, if a response packet that is agreed in advance with the current host to respond to the probe packet and that is returned by the destination receive end is received, determining that the probe packet is received by the destination receive end.

With reference to the fifth possible implementation of the first aspect, in a sixth possible implementation, when the to-be-sent data packet is the data packet first sent on the path by the current host, or when the PMTU entry that is of the path and that is on the current host is deleted, determining that the PMTU of the path is unknown; and the performing PMTU probing on the path includes: sending a first probe packet according to an MTU having a smaller length in the second MTU and the third MTU, where the second MTU is an MTU configured on a specific interface of the current host, the third MTU is an MTU indicated in a router advertisement RA packet that is received by the current host from the specific interface, and the specific interface is an egress interface used to send the to-be-sent data packet by the current host.

With reference to the fifth possible implementation of the first aspect, in a seventh possible implementation, when the current host is probing the PMTU of the path, it is determined that the PMTU of the path is unknown; and the performing PMTU probing on the path includes: continuing the PMTU probing that has been performed on the path.

With reference to the fifth possible implementation of the first aspect, in an eighth possible implementation, when the indication message sent by the network device on the path is received, it is determined that the PMTU of the path is unknown; and the performing PMTU probing on the path includes: obtaining an MTU supported by the network device from the indication message, and sending a first probe packet in an ongoing PMTU probing process of the path according to the obtained MTU.

According to a second aspect, an embodiment of the present invention provides a data packet sending apparatus in an Internet Protocol version 6, IPv6, network, including a processing unit and a transceiver unit, where the processing unit is configured to: before a PMTU of the path is probed, send a data packet on the path by using the transceiver unit and according to a minimum MTU stipulated in the IPv6 protocol; and after the PMTU of the path is probed, send a subsequent data packet on the path by using the transceiver unit and according to the probed PMTU of the path.

Optionally, the processing unit is further configured to: before sending the data packet on the path by using the transceiver unit and according to the minimum MTU stipulated in the IPv6 protocol, determine that a path maximum transmission unit PMTU of the path used by a to-be-sent data packet is unknown, send the to-be-sent data packet by using the transceiver unit and according to the minimum maximum transmission unit MTU stipulated in the IPv6 protocol, and perform the PMTU probing on the path.

With reference to the second aspect, in a first possible implementation, the processing unit is specifically configured to determine that the PMTU of the path is unknown when at least one of the following conditions is met:

the to-be-sent data packet is a data packet first sent on the path by the host;

a PMTU entry that is of the path and that is on the host is deleted;

the host is probing the PMTU of the path; or the transceiver unit receives an indication message sent by a network device on the path, where the indication message is used to indicate that a packet received on the path by the network device is excessively long.

With reference to the second aspect or the first possible implementation of the second aspect, in a second possible implementation, the processing unit is specifically configured to:

construct a probe packet by using a source IP address and a destination IP address of the to-be-sent data packet, and send the probe packet on the path by using the transceiver unit;

determine whether the sent probe packet is received by a destination receive end of the to-be-sent data packet; and if it is determined that the probe packet is received by the destination receive end, use a maximum MTU used in the probe packet received by the destination receive end as a probed PMTU of the path.

With reference to the second possible implementation of the second aspect, in a third possible implementation, the processing unit is further configured to: after determining whether the sent probe packet is received by the destination receive end of the to-be-sent data packet, if it is determined that the probe packet is not received by the destination receive end, determine whether the indication message sent by the network device on the path is received, where the indication message is used to indicate that a packet received on the path by the network device is excessively long;

if the indication message is received, repeatedly perform a first operation, until the probe packet is received by the destination receive end of the to-be-sent data packet, or until the probe packet is sent for N consecutive times but the indication message is not received and it cannot be determined that the probe packet is received by the destination receive end, where N is a positive integer, where the first operation includes: obtaining an MTU supported by the network device from the indication message, and sending the probe packet again by using the transceiver unit and according to the obtained MTU; and if the probe packet is received by the destination receive end of the to-be-sent data packet, use the maximum MTU used in the probe packet received by the destination receive end as the probed PMTU of the path.

With reference to the third possible implementation of the second aspect, in a fourth possible implementation, the processing unit is specifically configured to:

if the probe packet is sent by using the transceiver unit for N consecutive times but the indication message is not received and it cannot be determined that the probe packet is received by the destination receive end, repeatedly perform a second operation, until the transceiver unit receives the indication message or the probe packet is received by the destination receive end; and the second operation includes: setting a first MTU, and sending the probe packet by using the transceiver unit and according to the specified first MTU, where a length of the first MTU is not less than a length of the minimum MTU stipulated in the IPv6 protocol, and if the indication message is received, the length of the first MTU is not greater than a minimum value among a length of a second MTU, a length of a third MTU, and a length of an MTU indicated in the received indication message; or if the indication message is not received, the length of the first MTU is not greater than a smaller value of a length of a second MTU and a length of a third MTU;

the second MTU is an MTU configured on a specific interface of the current host, the third MTU is an MTU indicated in a router advertisement (RA) packet that is received by the transceiver unit from the specific interface, and the specific interface is an egress interface used to send the to-be-sent data packet by the transceiver unit;

if in a process of repeatedly performing the second operation, it is determined that the probe packet is received by the destination receive end of the to-be-sent data packet, use the maximum MTU used in the probe packet received by the destination receive end as the probed PMTU of the path; and if the indication message is received in the process of repeatedly performing the second operation, return to repeatedly perform the first operation, until the probe packet is received by the destination receive end of the to-be-sent data packet, or until the probe packet is sent for N consecutive times but the indication message is not received and it cannot be determined that the probe packet is received by the destination receive end.

With reference to any one of the second to the fourth possible implementations of the second aspect, in a fifth possible implementation, the probe packet is a transport layer protocol packet, where a destination port number of the probe packet is a port number that is not used by the destination receive end, and the processing unit is specifically configured to: after the transceiver unit sends the probe packet on the path, if the transceiver unit receives a peer end unreachable packet, determine that the probe packet is received by the destination receive end; or the probe packet is a ping packet, and the processing unit is specifically configured to: if the transceiver unit receives a response of the destination receive end after sending the probe packet on the path, determine that the probe packet is received by the destination receive end; or the probe packet is a trace route trace route packet, and the processing unit is specifically configured to: after the transceiver unit sends the probe packet on the path, if the transceiver unit receives a response of the destination receive end, determine that the probe packet is received by the destination receive end; or the probe packet is a protocol packet over a transport layer, and the processing unit is specifically configured to: after the transceiver unit sends the probe packet on the path, if the transceiver unit receives a response packet that is agreed in advance with the current host to respond to the probe packet and that is returned by the destination receive end, determine that the probe packet is received by the destination receive end.

With reference to the fifth possible implementation of the second aspect, in a sixth possible implementation, when the to-be-sent data packet is the data packet first sent on the path by the current host, or when the PMTU entry that is of the path and that is on the current host is deleted, determining that the PMTU of the path is unknown; and the transceiver unit is specifically configured to send a first probe packet and according to an MTU having a smaller length in the second MTU and the third MTU, where the second MTU is an MTU configured on a specific interface of the host, the third MTU is an MTU indicated in a router advertisement (RA) packet that is received by the transceiver unit from the specific interface, and the specific interface is an egress interface used to send the to-be-sent data packet by the transceiver unit.

With reference to the fifth possible implementation of the second aspect, in a seventh possible implementation, the processing unit is specifically configured to: when the PMTU of the path is being probed, determine that the PMTU of the path is unknown; and the processing unit is specifically configured to continue the PMTU probing that has been performed on the path.

With reference to the fifth possible implementation of the second aspect, in an eighth possible implementation, the processing unit is specifically configured to: when the transceiver unit receives the indication message sent by the network device on the path, determine that the PMTU of the path is unknown; and the processing unit is specifically configured to: obtain an MTU supported by the network device from the indication message, and send, by using the transceiver unit, a first probe packet in an ongoing PMTU probing process of the path according to the obtained MTU.

According to a third aspect, an embodiment of the present invention provides a host in an IPv6 network, including the apparatus according to any one of the second aspect or the possible implementations of the second aspect.

According to a fourth aspect, an embodiment of the present invention provides a data packet sending apparatus in an Internet Protocol version 6 (IPv6) network, including a processor and a transceiver, where the processor is configured to implement the method according to any one of the first aspect or possible implementations of the first aspect, and the transceiver is configured to implement receiving and/or sending in the method under control of the processor.

According to a fifth aspect, an embodiment of the present invention provides a host in an IPv6 network, including the apparatus according to the fourth aspect.

In the embodiments of the present invention, before the PMTU of the path is probed, a host node at a transmit end in the IPv6 network sends the data packet on the path according to the minimum MTU stipulated in the IPv6 protocol, and after the PMTU of the path is probed, sends the subsequent data packet on the path according to the probed PMTU of the path.

Before the PMTU of the path is probed, the data packet is sent by using the minimum MTU stipulated in the IPv6 protocol, and the minimum MTU can ensure that the data packet can pass through a network device having any MTU on the path, such as a router. Therefore, this ensures that the data packet sent on the path can be received by the destination receive end.

DESCRIPTION OF EMBODIMENTS

Embodiments of the present invention provide a data packet sending method and apparatus in an IPv6 network, so as to resolve a problem that a data packet may be always discarded before a PMTU of a path is probed by a data packet transmit end in a current IPv6 network.

In the embodiments of the present invention, before the PMTU of the path is probed, a host node at a transmit end in the IPv6 network sends a data packet on the path according to a minimum MTU stipulated in the IPv6 protocol, and after the PMTU of the path is probed, sends a subsequent data packet on the path according to the probed PMTU of the path.

Before the PMTU of the path is probed, the data packet is sent by using the minimum MTU stipulated in the IPv6 protocol, and the minimum MTU can ensure that the data packet can pass through a network device having any MTU on the path, such as a router. Therefore, this ensures that the data packet sent on the path can be received by a destination receive end.

The following describes the embodiments of the present invention in detail with reference to accompanying drawings.

Figure 1:
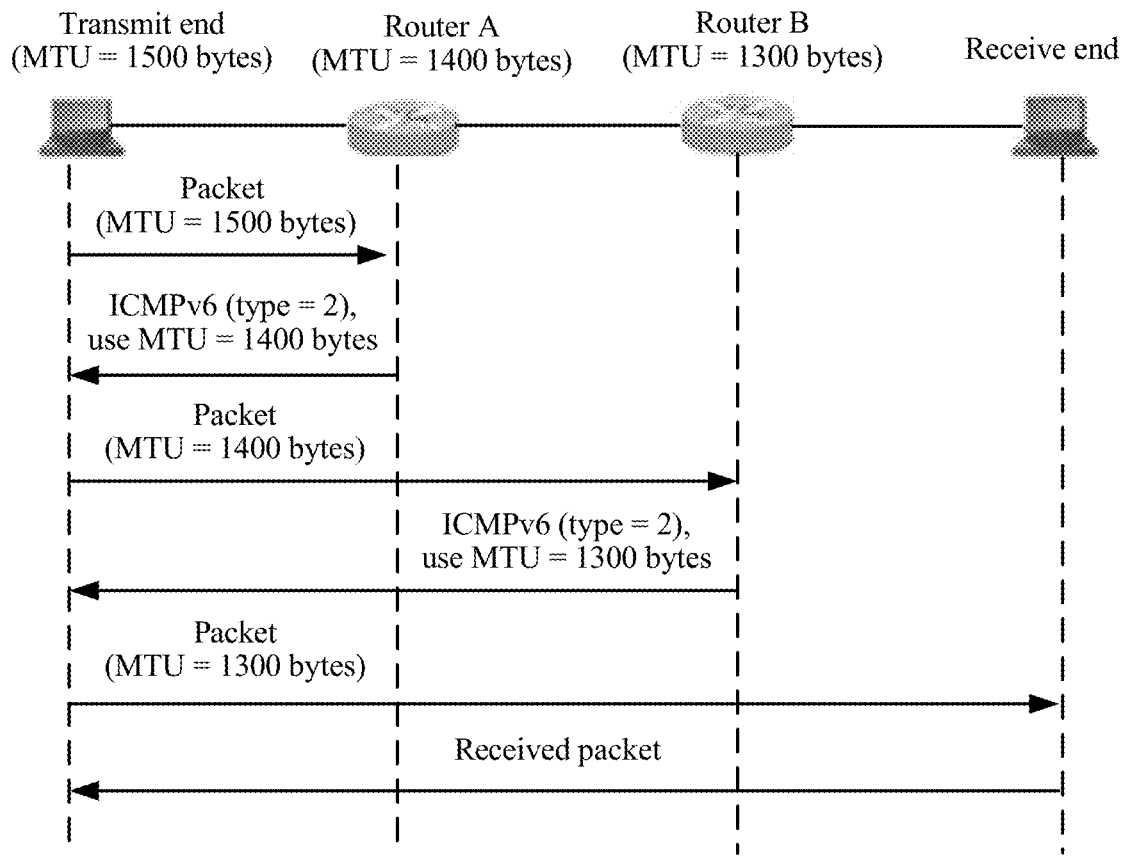
FIG. 1 is a schematic diagram of a PMTU probing method in a current IPv6 network.
Figure 2A:
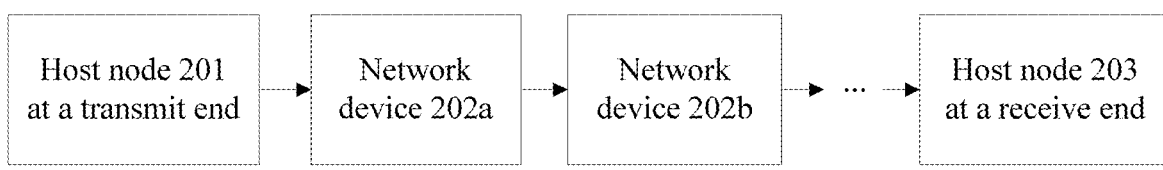
FIG. 2A is a schematic diagram of a possible transmission path of a data packet in an IPv6 network.

FIG. 2A shows a transmission path of a data packet in an IPv6 network. The data packet is sent from a host node 201 at a transmit end, passes through an intermediate network device 202a, an intermediate network device 202b, and the like, and finally arrives at a host node 203 at a destination receive end. Although FIG. 2A shows at least two intermediate network devices, actually, there may be only one intermediate network device, or there may be no intermediate network device.

The following first describes a data packet sending method according to an embodiment of the present invention.

Figure 2B:
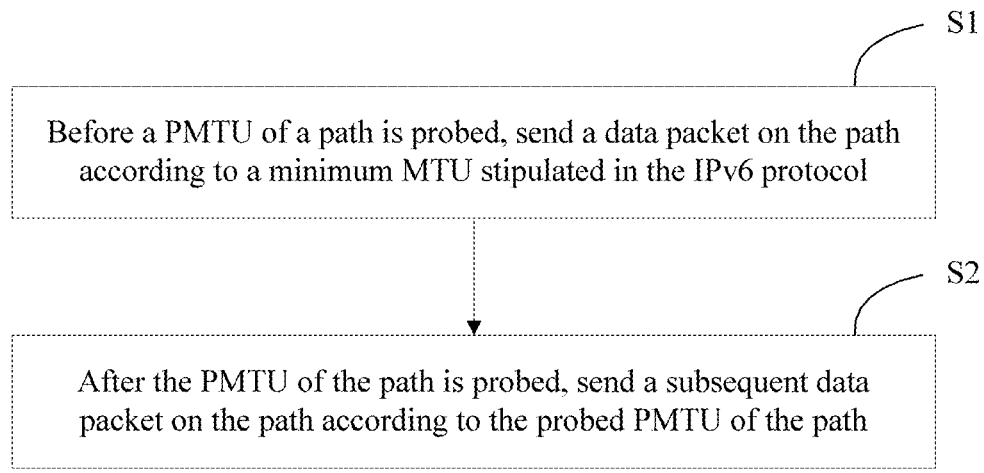
FIG. 2B is a flowchart of a data packet sending method according to an embodiment of the present invention.

Referring to FIG. 2B, a data packet sending method according to an embodiment of the present invention includes the following steps.

S1. Before a PMTU of a path is probed, send a data packet on the path according to a minimum MTU stipulated in the IPv6 protocol.

Optionally, the method further includes S2: After the PMTU of the path is probed, send a subsequent data packet on the path according to the probed PMTU of the path.

Figure 3A:
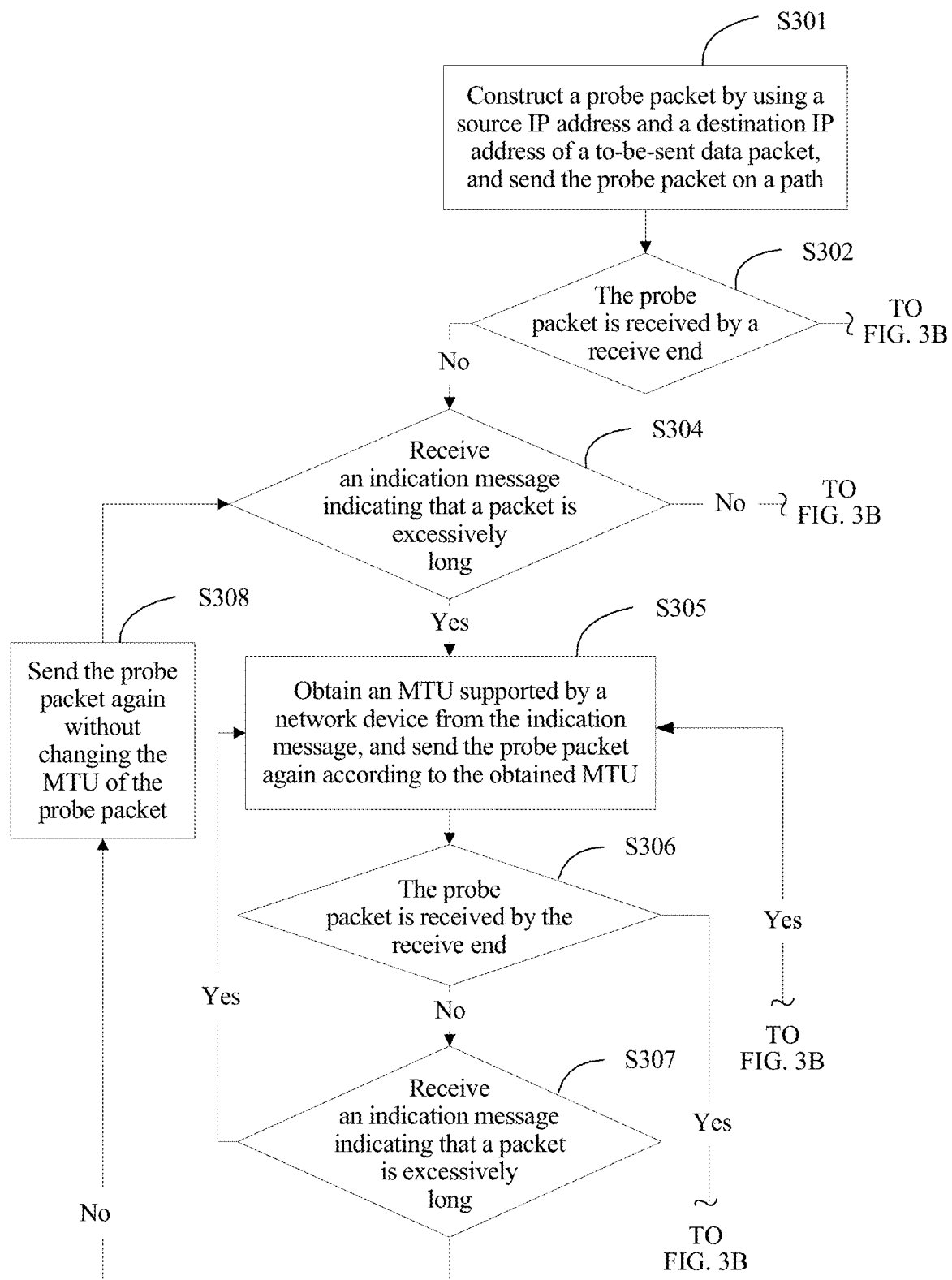
FIG. 3A and FIG. 3B are a schematic diagram of an optional PMTU probing process according to an embodiment of the present invention.
Figure 3B:
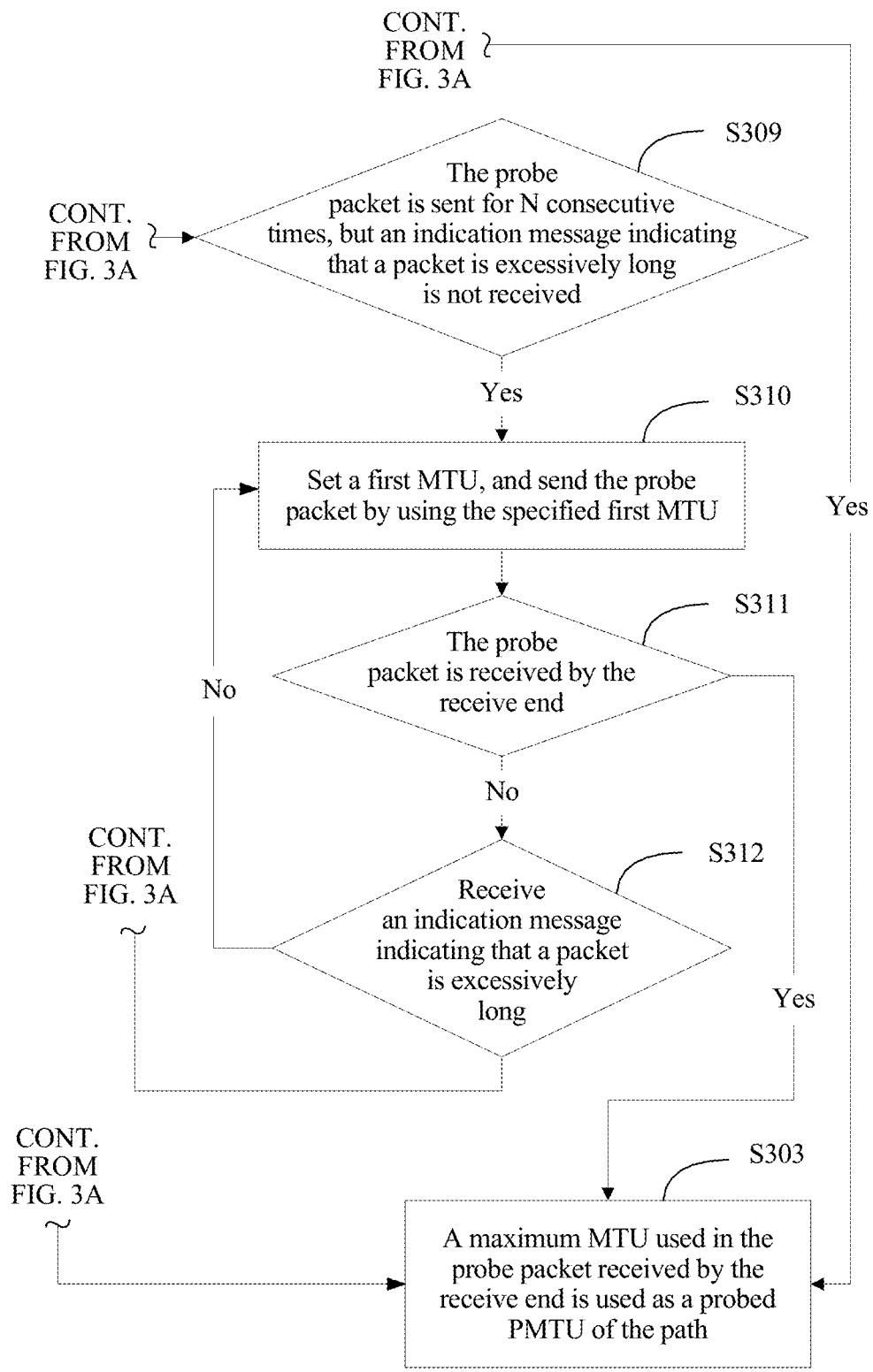

Optionally, before the sending a data packet on the path according to a minimum MTU stipulated in the IPv6 protocol, the method further includes:

determining that the PMTU that is of the path and that is used by a to-be-sent data packet is unknown; and sending the to-be-sent data packet according to the minimum MTU, such as 1280 bytes, stipulated in the IPv6 protocol, and performing PMTU probing on the path shown in FIG. 3A and FIG. 3B.

Before the PMTU of the path is probed, the data packet is sent by using the minimum MTU stipulated in the IPv6 protocol, and the minimum MTU can ensure that the data packet can pass through a network device having any MTU on the path, such as a router. Therefore, this ensures that the data packet sent on the path can be received by a destination receive end.

The host node 201 and the host node 203 may be any devices that can send and receive a data packet in the IPv6 network, such as a personal computer (Personal Computer), a base station, a core network, and a mobile phone terminal.

[A Condition for Determining that the PMTU of the Path is Unknown]

The host node 201 may determine that the PMTU of the path is unknown when at least one of the following conditions is met:

Condition 1: A PMTU entry of the path on the host node 201 is deleted (a final state in FIG. 4A and FIG. 4B). For example, the PMTU entry is deleted when it is not used for a long time after being stale.

Condition 2: The host node 201 is probing the PMTU of the path (a probe state in FIG. 4A and FIG. 4B).

Condition 3: The host node 201 receives an indication message sent by a network device (such as the network device 202a) on the path, where the indication message is used to indicate that a packet received by the network device on the path is excessively long, such as the foregoing message of ICMPv6 (type=2). Optionally, after receiving the message, the host node 201 enters the probe state shown in FIG. 4A and FIG. 4B.

[A PMTU Probing Process]

Optionally, referring to FIG. 3A and FIG. 3B, when the host node 201 performs PMTU probing on a path, the PMTU probing may be specifically implemented by using the following steps.

S301. The host node 201 constructs a probe packet by using a source IP address and a destination IP address of a to-be-sent data packet, and sends the probe packet on the path.

Optionally, the host node 201 sets a length of the probe packet, and the specified length may be a smaller value of the following two lengths:

a length of an MTU configured on a specific interface of the host node 201; or a length of an MTU indicated in a router advertisement (Router Advertisement, RA) packet that is received from the specific interface by the host node 201.

The foregoing specific interface is an egress interface used to send the foregoing to-be-sent data packet by the host node 201.

Because the probe packet is used to probe a PMTU of the path of the to-be-sent data packet, the destination IP address of the to-be-sent data packet is used to construct the probe packet herein. To receive a subsequent indication message used to indicate that a packet is excessively long, so as to subsequently determine that the host node 203 at the destination receive end receives the probe packet, the source IP address of the to-be-sent data packet is used to construct the probe packet herein.

The data packet is used to carry to-be-sent data, and the probe packet is used to probe the PMTU of the path. Combinations of a protocol type and a destination port number used for the probe packet and the data packet are different. For example, the probe packet and the data packet are sent by using different protocol types and a same destination port number; or the probe packet and the data packet are sent by using a same protocol type and different destination port numbers; or the probe packet and the data packet are sent by using different protocol types and different destination port numbers.

S302. Determine whether the sent probe packet is received by the host node 203; if the probe packet is received by the host node 203, perform step S303; or if the probe packet is not received by the host node 203, perform step S304. For a method for determining whether the sent probe packet is received by the host node 203, refer to description in the following "[multiple optional probe packets]".

S303. A maximum MTU used for a probe packet received by the host node 203 is used as a probed PMTU of a path.

S304. Determine whether an indication message indicating that a packet sent by a network device on the path is excessively long is received, where the indication message is used to indicate that the packet received by the network device on the path is excessively long; if the indication message is received, perform step S305; or if the indication message is not received, perform step S309.

S305. Obtain an MTU supported by the network device from the received indication message, and send the probe packet again according to the obtained MTU.

S306. Determine whether the sent probe packet is received by the host node 203; if the probe packet is received by the host node 203, perform step S303; or if the probe packet is not received by the host node 203, perform step S307.

S307. Determine whether an indication message indicating that a packet sent by the network device on the path is excessively long is received; if the indication message is received, return to perform step S305; or if the indication message is not received, perform step S308.

S308. Send the probe packet again without changing the MTU of the probe packet, and then return to step S304.

S309. Determine that the probe packet is sent for N consecutive times but an indication message indicating that a packet is excessively long is not received, where N is a positive integer.

Step S308 and step S309 are set for a case in which a layer 2 switch may exist on the path. When a packet received by the layer 2 switch is excessively long, the packet is directly discarded, and the indication message indicating that the packet is excessively long is not returned to the host node 201. In this way, the host node 201 cannot learn a receiving state of the packet. If the probe packet is sent for N consecutive times but an indication message indicating that the packet is excessively long is not received, the host node

201 may determine that the layer 2 switch exists on the path, and a length of the sent packet exceeds a packet length that is acceptable to the layer 2 switch. Therefore, a subsequent step such as step S310 is performed.

In addition, a packet loss may occur when the probe packet is transmitted, and therefore, the probe packet is sent for N consecutive times. In this way, it is determined more accurately that the layer 2 switch exists on the path. The value N may be set according to an actual network condition, for example, be set to 1, 2, 3, . . . , and, may be set to 3 to 5.

S310. Set a first MTU, and send the probe packet by using the specified first MTU.

Optionally, a length of the first MTU is not less than the length of the minimum MTU stipulated in the IPv6 protocol, and is not greater than a minimum value among a length of a second MTU, a length of a third MTU, and a length of an MTU indicated in the indication message that is used to indicate a packet process and that is received in the foregoing steps. If the foregoing indication message is not received in the foregoing steps, the length of the first MTU is not less than the length of the minimum MTU stipulated in the IPv6 protocol, and is not greater than a smaller value of the length of the second MTU and the length of the third MTU; or if multiple indication messages are received in the foregoing steps, when the length of the first MTU is set, a minimum MTU indicated in the received multiple indication messages is used.

The second MTU is the MTU configured on the specific interface of the host node 201.

The third MTU is the MTU indicated in the router advertisement (Router Advertisement, RA) packet that is received from the specific interface by the host node 201.

For example, in step S301, if the length of the probe packet is set to a smaller value of the following two lengths: the length of the MTU configured on the specific interface of the host node 201 and the length of the MTU indicated in the RA packet that is received on the specific interface by the host node 201, in step S301, a value may be selected as the first MTU from an interval formed by the length of the minimum MTU stipulated in the IPv6 protocol and the length of the probe packet that is set in step S301, and the probe packet is sent according to the first MTU.

The foregoing specific interface is an egress interface used to send the foregoing to-be-sent data packet by the host node 201. Optionally, the egress interface is a layer 3 interface. The interface may be configured on a physical interface of the host node 201, or may be configured on a VLAN sub-interface obtained by performing virtual local area network (Virtual Local Area Network, VLAN) division on a physical interface of the host node 201.

Optionally, in step S310, the first MTU may be set multiple times for probing, to obtain a relatively accurate PMTU of the path. For example, a dichotomy may be used for probing. Herein, for example, the length of the minimum MTU stipulated in the IPv6 protocol is 1280 bytes, and the smaller value of the length of the second MTU and the length of the third MTU is 1600 bytes. When the dichotomy is used for probing, probing is performed multiple times by using 1280 bytes as an initial minimum value (min) and by using 1600 bytes as an initial maximum value (max).

In a process of probing by using the dichotomy, if it is determined that the probe packet is received by the host node 203, an MTU used for the probe packet sent this time is used as a new minimum value to continue the probing. If it cannot be determined that the probe packet is received by the host node 203, the MTU used for the probe packet sent this time is used as a new maximum value to continue the probing, until the minimum value is not less than the maximum value.

In the foregoing process of probing multiple times by using the dichotomy, a maximum MTU used for the probe packet received by the host node 203 is used as a probed PMTU of the path.

Figure 5A:
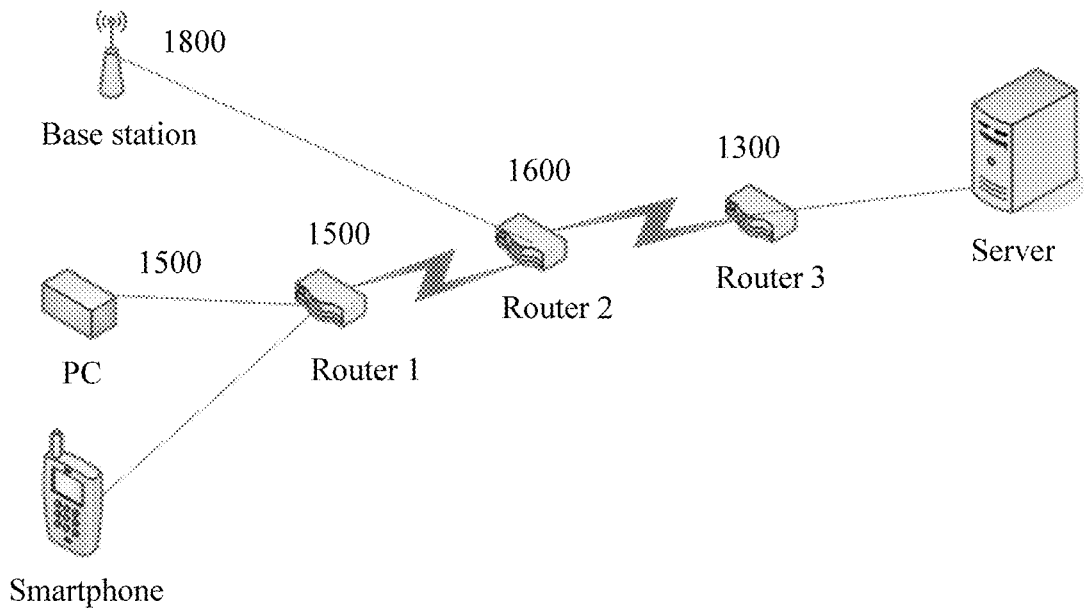
FIG. 5A is a schematic diagram of a simple IPv6 networking scenario.
Figure 5B:
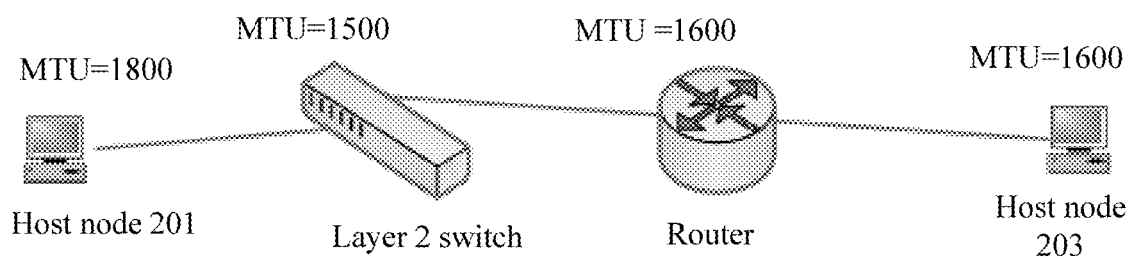
FIG. 5B and FIG. 5C are schematic diagrams of a scenario in which a layer 2 switch exists on a path.
Figure 5C:
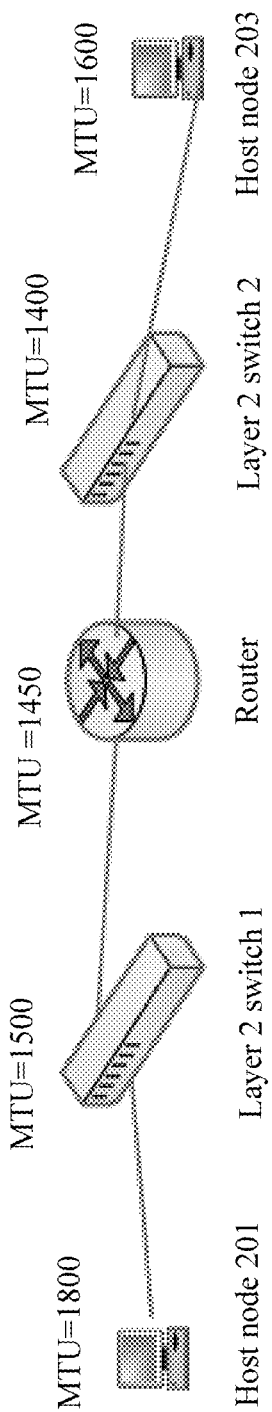

Scenarios in which the layer 2 switch exists on the path shown in FIG. 5B and FIG. 5C are used as examples for description below.

As shown in FIG. 5B, an MTU of the host node 201 is 1800 bytes, an MTU for initially sending a probe packet is 1800 bytes, the foregoing indication message used to indicate that a packet is excessively long is not received after N times, and it cannot be determined that the host node 203 receives the probe packet. Therefore, it is determined that the layer 2 switch exists on the path, and step S310 is performed to perform layer 2 probing. For example, if the foregoing dichotomy is used for probing, probing is performed multiple times by using 1280 bytes as an initial minimum value (min) and by using 1800 bytes as an initial maximum value (max).

As shown in FIG. 5C, after the probe packet passes through a layer 2 switch 1, an indication message that is used to indicate that the packet is excessively long and that is sent by a router is received, and then an MTU that is 1450 bytes indicated in the indication message is used to continue the probing. If an indication message used to indicate that the packet is excessively long is not received for N consecutive times, and it cannot be determined that the host node 203 receives the probe packet, step S310 is performed to perform layer 2 probing. For example, if the foregoing dichotomy is used for probing, probing is performed multiple times by using 1280 bytes as an initial minimum value (min) and by using 1450 bytes as an initial maximum value (max).

S311. Determine whether the sent probe packet is received by the host node 203; if the probe packet is received by the host node 203, perform step S303; or if the probe packet is not received by the host node 203, perform step S312.

S312. Determine whether an indication message indicating that a packet sent by the network device on the path is excessively long is received; if the indication message is received, perform step S305; or if the indication message is not received, return to perform step S310.

Figure 4A:
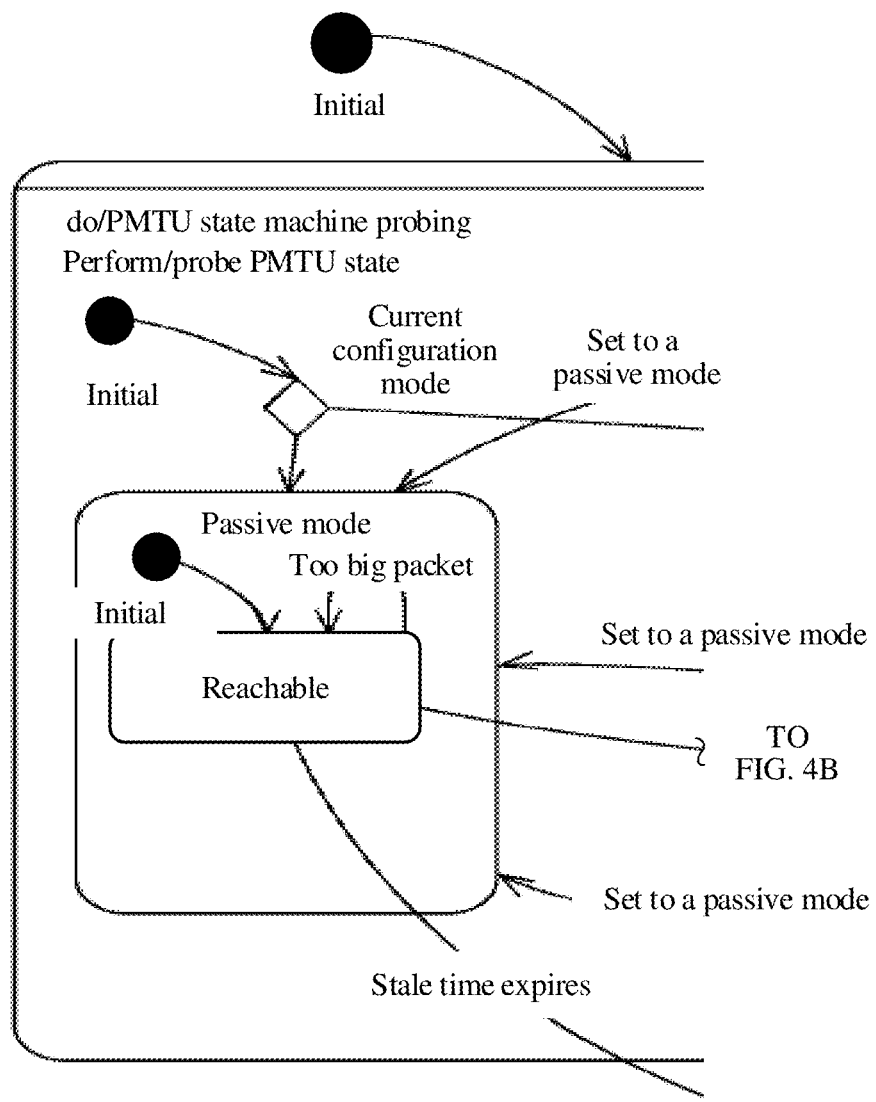
FIG. 4A and FIG. 4B are a schematic diagram of a possible implementation of internal implementation of a host node according to an embodiment of the present invention.
Figure 4B:
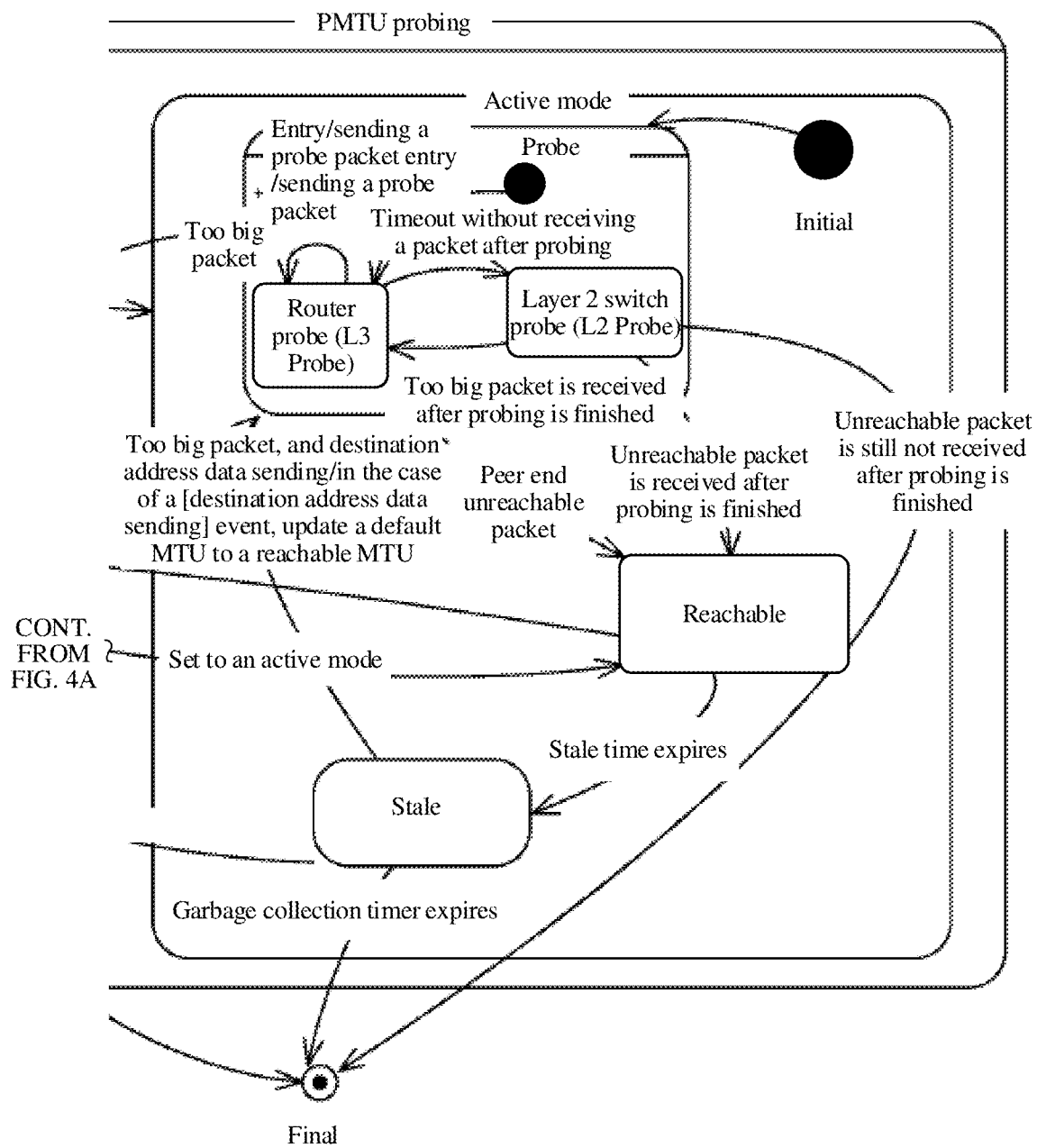

The foregoing describes the method for probing the PMTU of the path by the host node 201, and the following describes an optional manner of internal implementation of the host node 201 with reference to FIG. 4A and FIG. 4B.

[Internal Implementation of the Host Node 201]

As shown in FIG. 4A and FIG. 4B, a mode for performing the PMTU probing by the host node 201 may be classified into an active mode and a passive mode. The mode may be set and modified by performing a man-machine operation, so that a user of the host node 201 can flexibly select a probing mode.

1. The Active Mode

In the active mode, the host node 201 performs the PMTU probing on the path by sending a probe packet.

According to the active mode, separation between the probe packet and the data packet is implemented, and when the PMTU of the path is unknown, a loss rate of the data packet is reduced in comparison with a current manner of changing an MTU length of the data packet.

2. The Passive Mode

In a process of sending the data packet, if an indication message indicating that a packet of, for example, ICMP (type=2) is excessively large is received, the host node 201 adjusts the MTU length of the data packet, until the indication message indicating that the packet is excessively large is no longer received.

In the passive mode, the data packet is lost before the PMTU of the path is probed.

Referring to FIG. 4A and FIG. 4B, in the active mode, a status in a PMTU probing process includes:

1. A Probe (Probe) State

This state is a substate of the active mode.

In this state, the host node 201 sends the probe packet, and if it is determined that the PMTU of the path is probed, the state is changed to a reachable (Reachable) state.

The probe state includes two substates: a router probe state (L3 Probe) and a layer 2 switch probe state (L2 Probe), and the host node 201 initially enters the router probe state (L3 Probe).

In the router probe state (L3 Probe): When a too big packet is not received and a peer end unreachable packet is not received after the probe packet is sent for N consecutive times, the host node 201 enters the layer 2 switch probe state (L2 Probe); if a too big packet is received, an MTU in the too big packet is used for probing; or if a peer end unreachable packet is received, the host node 201 enters a reachable (Reachable) state.

In the layer 2 switch probe state (L2 Probe): Perform an operation in S310, and probe an optimal PMTU. After the probing is finished, if an unreachable packet is received, the host node 201 enters the reachable (Reachable) state; if a too big packet is received, the host node 201 enters the router probe state (L3 Probe); or if a too big packet is still not received, and a peer end unreachable packet is not received either, the host node 201 enters a final state.

2. A Reachable (Reachable) State

In this case, the host node 201 uses a probed MTU when sending a data packet. After a preset stale time expires, the host node 201 enters a stale (Stale) state.

3. A Stale (Stale) State

This state is a substate of the active mode.

In this state, the host node 201 still uses the previously probed PMTU to send a data packet.

When in this state, if there is no data packet to be sent, after a preset garbage collection timer expires, the host node 201 enters a final (Final) state.

When in this state, if there is a data packet to be sent, the host node 201 enters a probe state, and probing continues. When the data packet is sent in the probe state, a probed PMTU in a last entered reachable state is still used, so as to ensure sending efficiency of the data packet.

In the passive mode, an initial status is set to a reachable (Reachable) state. After a message of ICMP (type=2) is received, or after a too big (Too Big) packet is received, the state does not change, and an MTU for the sent data packet is adjusted, until the data packet is received by the host node 203.

An optional manner of the internal implementation of the host node 201 is described above, and multiple optional solutions of constructing a probe packet by the host node 201 are described below.

[Multiple Optional Probe Packets]

1. A probe packet is a transport layer protocol packet.

For example, a User Datagram Protocol (user datagram protocol, UDP) packet, a Transmission Control Protocol (Transmission Control Protocol, TCP) packet, a Stream Control Transmission Protocol (Stream Control Transmission Protocol, SCTP) packet, a network basic input/output system (Net Basic Input/Output System, NetBIOS) packet, a NetBIOS enhanced user interface (NetBIOS Enhanced User Interface, NetBEUI) packet, and the like.

A destination port number of the probe packet is a port number that is not used by the host node 203, and the port number may be a well-known port number or an ephemeral port number. In this case, if a peer end unreachable packet (not reachable) is received after the probe packet is sent on the path, it is determined that the probe packet is received by the host node 203. A purpose of such setting is that: If the destination port number of the probe packet is a port number used by the host node 203, the host node 203 does not return a peer end unreachable packet.

The well-known port number is a port number of a transport layer protocol used by an upper layer protocol over a transport layer stipulated in a protocol, and these port numbers cannot be used by an application program of a user. For example, a port number of a transport layer protocol TCP used by a telnet (telnet) server is 23.

The ephemeral port number is a port number, other than the well-known port number, of the transport layer protocol.

Optionally, the host node 201 may perform port scanning in advance to determine which ports of the host node 203 are not used. If a port of the host node 203 is preconfigured, the host node 201 may determine, by obtaining configuration data of the host node 203, which ports of the host node 203 are not used.

2. A probe packet is a ping packet.

If the host node 201 receives a response from the host node 203 after sending the probe packet on the path, the host node 201 determines that the probe packet is received by the host node 203.

3. A probe packet is a trace route (trace route) packet.

After the host node 201 receives a response from the host node 203 after sending the probe packet on the path, the host node 201 determines that the probe packet is received by the host node 203.

4. A probe packet is a protocol packet over a transport layer.

The host node 201 and the host node 203 agree in advance that, when the host node 201 sends a probe packet, if the host node 203 receives the probe packet, the host node 203 responds to the received probe packet, and returns a response packet that is agreed in advance. Therefore, if the host node 201 receives the response packet that is agreed in advance after sending the probe packet on the path, the host node 201 determines that the probe packet is received by the host node 203.

The multiple optional implementations of the probe packet are described above, and setting of a probe packet length is described below for different probing trigger conditions.

[Setting of a Probe Packet Length]

1. When a to-be-sent data packet is a data packet first sent by the host node 201 on the path, or when a PMTU entry of the path of the host node 201 is deleted, the host node 201 determines that the PMTU of the path is unknown.

In this case, the first probe packet is sent according to an MTU having a smaller length in the second MTU and the third MTU.

2. When probing a PMTU of the path, the host node 201 determines that the PMTU of the path is unknown.

In this case, the host node 201 may continue the PMTU probing that has been performed on the path.

3. When receiving an indication message indicating that a packet sent by a network device such as a network device 202a on the path is excessively long, the host node 201 determines that the PMTU of the path is unknown.

In this case, the host node 201 obtains an MTU from the indication message, and sends a first probe packet in an ongoing PMTU probing process of the path according to the obtained MTU.

A specific IPv6 networking environment is used as an example to describe various scenarios applicable to the embodiments of the present invention.

Scenarios Applicable to the Embodiments of the Present Invention

FIG. 5A shows a simple IPv6 networking scenario. The host node 201 in FIG. 2A may be a PC, a smartphone, or a base station in FIG. 5A, and the host node 203 in FIG. 2A is a server in FIG. 5A. A number marked on each device in FIG. 5A is a byte quantity of an MTU supported by the device.

Examples of the scenarios are distinguished for description below.

1. A Newly Constructed Network Scenario

When a base station sends a data packet, because the data packet is a data packet first sent by the base station on a path, a minimum MTU stipulated in the IPv6 protocol is used. For example, the data packet is sent by using 1280 bytes, and PMTU probing on the path is performed.

Because the data packet is sent by using the minimum MTU stipulated in the IPv6 protocol, the data packet can pass through any router on the path, that is, a router 2 and a router 3, and arrive at the server.

When performing the PMTU probing on the path, because the MTU configured on the egress interface for sending the data packet is 1800 bytes, if an MTU indicated in the RA packet that is received by the host node 201 from the egress interface for sending the data packet is 1600 bytes, the host node 201 sends the probe packet by using a smaller MTU, 1600 bytes, of the two MTUs, and the sent probe packet can pass through the router 2, and arrive at the router 3.

Because an MTU supported by the router 3 is 1300 bytes, the router 3 returns a message of ICMP (type=2) to the base station, and indicates that a supported MTU is 1300 bytes.

When the base station sends a next probe packet, the MTU that is 1300 bytes is used to send the probe packet, and the probe packet can arrive at the server. After receiving a response sent by the server, the base station determines, according to the response received from the server, for example, the probe packet is a ping packet, that the server receives the probe packet, and the base station uses 1300 bytes as a probed PMTU of the path.

2. A Network Reconstruction Scenario

That the base station serves as the host node 201 is still used as an example. The PMTU of the path probed by the base station is 1300 bytes, and a subsequent data packet is sent on the path by using the 1300 bytes.

If an MTU of the router 3 is changed to 1280 bytes, the data packet sent by the host node 201 is discarded by the router 3, and the router 3 returns a message of ICMP (type=2) to the base station, and indicates that a supported MTU is 1280 bytes.

After receiving the message of ICMP (type=2), the host node 201 sends a data packet by using the minimum MTU stipulated in the IPv6 protocol, and performs PMTU probing, and a new PMTU of the path finally obtained by means of probing is 1280 bytes.

In this case, when receiving a message of ICMP (type=2), the host node 201 sends a data packet by using the minimum MTU stipulated in the IPv6 protocol. Therefore, the data packet that may be discarded by the router 3 is only a data packet sent by the base station on the path after the MTU of the router 3 is changed to 1280 bytes and before the base station receives the message of ICMP (type=2). Compared with a current PMTU probing method, this avoids a data packet loss caused by an excessively long length of the data packet in a probing process.

3. Stale PMTU

After the PMTU is stale, if there is no data packet to be sent on a path for a long time, the host node 201 deletes a PMTU entry of the path recorded by itself, and enters a final state shown in FIG. 4A and FIG. 4B. In the stale state, if there is a data packet to be sent on the path again in this case, the host node 201 may perform PMTU probing again, and the data packet is sent by using the previously learned PMTU, improving reliability.

The data packet sending method in this embodiment of the present invention is described above, and two data packet sending apparatuses according to an embodiment of the present invention are described below.

Figure 6:
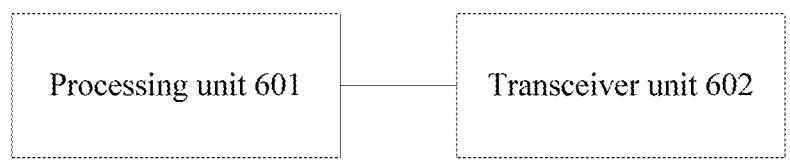
FIG. 6 is a schematic structural diagram of a data packet sending apparatus according to an embodiment of the present invention.

FIG. 6 shows a first data packet sending apparatus according to an embodiment of the present invention. As shown in FIG. 6, the apparatus includes a processing unit 601 and a transceiver unit 602.

The processing unit 601 is configured to: before a PMTU of a path is probed, send a data packet on the path by using the transceiver unit 602 according to a minimum MTU stipulated in the IPv6 protocol; and after the PMTU of the path is probed, send a subsequent data packet on the path by using the transceiver unit 602 and according to the probed PMTU of the path.

Optionally, the processing unit 601 is further configured to: before sending the data packet on the path by using the transceiver unit 602 and according to the minimum MTU stipulated in the IPv6 protocol, determine that a PMTU of the path used by a to-be-sent data packet is unknown; and send the to-be-sent data packet by using the transceiver unit 602 and according to the minimum MTU stipulated in the IPv6 protocol, and perform PMTU probing on the path.

Optionally, the processing unit 601 is specifically configured to determine that the PMTU of the path is unknown when at least one of the following conditions is met:

the to-be-sent data packet is a data packet first sent by a host on the path;

a PMTU entry of the path on a host is deleted; or the host is probing the PMTU of the path.

The transceiver unit 602 receives an indication message sent by a network device on the path, where the indication message is used to indicate that a packet received on the path by the network device is excessively long.

Optionally, the processing unit 601 is specifically configured to:

construct a probe packet by using a source IP address and a destination IP address of the to-be-sent data packet, and send the probe packet on the path by using the transceiver unit 602;

determine whether the sent probe packet is received by a destination receive end of the to-be-sent data packet; and if it is determined that the probe packet is received by the destination receive end, use a maximum MTU used in the probe packet received by the destination receive end as a probed PMTU of the path.

Optionally, the processing unit 601 is further configured to: after determining whether the sent probe packet is received by the destination receive end of the to-be-sent data packet, if it is determined that the probe packet is not received by the destination receive end, determine whether the indication message sent by the network device on the path is received, where the indication message is used to indicate that a packet received on the path by the network device is excessively long;

if the indication message is received, repeatedly perform a first operation, until the probe packet is received by the destination receive end of the to-be-sent data packet, or until the probe packet is sent for N consecutive times but the indication message is not received and it cannot be determined that the probe packet is received by the destination receive end, where N is a positive integer, where the first operation includes: obtaining an MTU supported by the network device from the indication message, and sending the probe packet again by using the transceiver unit 602 and according to the obtained MTU; and if the probe packet is received by the destination receive end of the to-be-sent data packet, use the maximum MTU used in the probe packet received by the destination receive end as the probed PMTU of the path.

Optionally, the processing unit 601 is specifically configured to:

if the probe packet is sent for N consecutive times by using the transceiver unit 602 but the indication message is not received and it cannot be determined that the probe packet is received by the destination receive end, repeatedly perform a second operation, until the transceiver unit 602 receives the indication message or the probe packet is received by the destination receive end, where the second operation includes: setting a first MTU, and sending the probe packet by using the transceiver unit 602 and according to the specified first MTU, where a length of the first MTU is not less than a length of the minimum MTU stipulated in the IPv6 protocol, the length of the first MTU is not greater than a smaller value of a length of a second MTU and a length of a third MTU, the second MTU is an MTU configured on a specific interface of a current host, the third MTU is an MTU indicated in a router advertisement (RA) packet that is received from the specific interface by the transceiver unit 602, and the specific interface is an egress interface used to send the to-be-sent data packet by the transceiver unit 602;

if in a process of repeatedly performing the second operation, it is determined that the probe packet is received by the destination receive end of the to-be-sent data packet, use the maximum MTU used in the probe packet received by the destination receive end as the probed PMTU of the path; and if the indication message is received in the process of repeatedly performing the second operation, return to repeatedly perform the first operation, until the probe packet is received by the destination receive end of the to-be-sent data packet, or until the probe packet is sent for N consecutive times but the indication message is not received and it cannot be determined that the probe packet is received by the destination receive end.

Optionally, the probe packet is a transport layer protocol packet, where a destination port number of the probe packet is a port number that is not used by the destination receive end, and the processing unit 601 is specifically configured to: after the transceiver unit 602 sends the probe packet on the path, if the transceiver unit 602 receives a peer end unreachable packet, determine that the probe packet is received by the destination receive end; or the probe packet is a ping packet, and the processing unit 601 is specifically configured to: if the transceiver unit 602 receives a response of the destination receive end after sending the probe packet on the path, determine that the probe packet is received by the destination receive end; or the probe packet is a trace route trace route packet, and the processing unit 601 is specifically configured to: after the transceiver unit 602 sends the probe packet on the path, if the transceiver unit 602 receives a response of the destination receive end, determine that the probe packet is received by the destination receive end; or the probe packet is a protocol packet over a transport layer, and the processing unit 601 is specifically configured to: after the transceiver unit 602 sends the probe packet on the path, if the transceiver unit 602 receives a response packet that is agreed in advance with the current host to respond to the probe packet and that is returned by the destination receive end, determine that the probe packet is received by the destination receive end.

Optionally, when the to-be-sent data packet is the data packet first sent by the current host on the path, or when the PMTU entry of the path on the current host is deleted, it is determined that the PMTU of the path is unknown.

The transceiver unit 602 is specifically configured to send a first probe packet and according to an MTU having a smaller length in a second MTU and a third MTU, where the second MTU is an MTU configured on a specific interface of the host, the third MTU is an MTU indicated in a router advertisement (RA) packet that is received by the transceiver unit 602 from the specific interface, and the specific interface is an egress interface used to send the to-be-sent data packet by the transceiver unit 602.

Optionally, the processing unit 601 is specifically configured to: when the PMTU of the path is being probed, determine that the PMTU of the path is unknown; and the processing unit 601 is specifically configured to continue the PMTU probing that has been performed on the path.

Optionally, the processing unit 601 is specifically configured to: when the transceiver unit 602 receives an indication message sent by a network device on the path, determine that the PMTU of the path is unknown; and the processing unit 601 is specifically configured to: obtain an MTU supported by the network device from the indication message, and send, by using the transceiver unit 602, a first probe packet in an ongoing PMTU probing process of the path according to the obtained MTU.

In the foregoing data packet sending apparatus in this embodiment of the present invention, for the transmission path of the data packet, refer to FIG. 2A and the foregoing related descriptions. In the apparatus, for the method for controlling sending of the data packet by the processing unit 601, refer to the above-described data packet sending method. In the apparatus, for the condition for determining that the PMTU of the path is unknown by the processing unit 601, refer to the foregoing "[a condition for determining that the PMTU of the path is unknown]". In the apparatus, for the process of controlling, by the processing unit 601, the transceiver unit 602 to perform PMTU probing, refer to the foregoing "[a PMTU probing process]". For the internal implementation of the apparatus, refer to the foregoing "[internal implementation of the host node 201]". In the apparatus, for the probe packet type, setting of the corresponding probe packet length, and the probing solution, refer to the foregoing descriptions in "[multiple optional probe packets]" and "[setting of a probe packet length]". The apparatus may be applied to the foregoing "[scenarios applicable to the embodiments of the present invention]".

In the foregoing data packet sending apparatus in this embodiment of the present invention, the processing unit 601 may be implemented by a processor, and the transceiver unit 602 may be implemented by a transceiver, or may be implemented by a transmitter and a receiver, where the transmitter is configured to send a data packet, a message, and the like, and the receiver is configured to receive the data packet, the message, and the like. The processor and the transceiver, or the processor, the transmitter, and the receiver for implementing the apparatus may be integrated into one chip or multiple chips for implementation.

An embodiment of the present invention further provides a host, including the data packet sending apparatus shown in FIG. 6. In the apparatus shown in FIG. 6, both an egress interface used to send a data packet and an interface for receiving a message are interfaces on the host.

Figure 7:
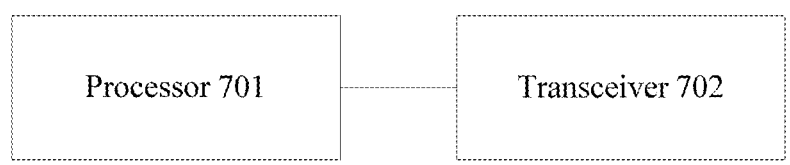
FIG. 7 is a schematic structural diagram of another data packet sending apparatus according to an embodiment of the present invention.

FIG. 7 is another data packet sending apparatus according to an embodiment of the present invention. As shown in FIG. 7, the apparatus includes a processor 701 and a transceiver 702.

The processor 701 is configured to implement the data packet sending method according to an embodiment of the present invention; and the transceiver 702 is configured to implement receiving and sending in the data packet sending method according to an embodiment of the present invention under control of the processor 701.

The processor 701 may be implemented by one or more processors, and the transceiver 702 may be implemented by a transceiver, or may be implemented by a transmitter and a receiver, where the transmitter is configured to send a data packet, a message, and the like, and the receiver is configured to receive the data packet, the message, and the like. The processor 701 and the transceiver 702 may be integrated into one chip or multiple chips for implementation.

In conclusion, in this embodiment of the present invention, before the PMTU of the path is probed, the host node at the transmit end in the IPv6 network sends the data packet on the path according to the minimum MTU stipulated in the IPv6 protocol, and after the PMTU of the path is probed, sends the subsequent data packet on the path according to the probed PMTU of the path.

Before the PMTU of the path is probed, the subsequent data packet is sent by using the minimum MTU stipulated in the IPv6 protocol, and the minimum MTU can ensure that the data packet can pass through a network device having any MTU on the path, such as a router. Therefore, this ensures that the data packet sent on the path can be received by a destination receive end.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present invention have been described, persons skilled in the art can make changes and modifications to these embodiments once they learn the basic inventive concept. Therefore, the appended claims are intended to be construed as to cover the embodiments and all changes and modifications falling within the scope of the present invention.

Obviously, persons skilled in the art can make various modifications and variations to the embodiments of the present invention without departing from the scope of the embodiments of the present invention. The present invention is intended to cover these modifications and variations provided that they fall within the scope of protection defined by the appended claims and their equivalent technologies.

What is claimed is:

1. A data packet sending method in an Internet Protocol version 6 (IPv6) network, comprising:
   determining that a path maximum transmission unit (PMTU) of a path is unknown;
   after determining that the PMTU of the path is unknown and before the PMTU of the path is obtained successfully, sending one or more data packets on the path according to a minimum maximum transmission unit (MTU) stipulated in the IPv6 protocol to ensure the one or more data packets are small enough to pass through any network device having any MTU on the path, wherein the one or more data packets carry to-be-sent data;
   performing PMTU probing on the path, wherein performing PMTU probing on the path comprises: constructing a probe packet by using a source IP address and a destination IP address, and sending the probe packet on the path; and
   after the PMTU of the path is obtained successfully through the PMTU probing, sending one or more subsequent data packets on the path according to the PMTU of the path.

2. The method according to claim 1, wherein the PMTU of the path is determined to be unknown when at least one of the following conditions is met:

a to-be-sent data packet is a data packet first sent on the path by a current host;
a PMTU entry that is of the path and that is on a current host is deleted;
a current host is probing the PMTU of the path; or
a current host receives an indication message sent by a network device on the path, wherein the indication message is used to indicate that a packet received on the path by the network device is excessively long.

3. The method according to claim 1, wherein the PMTU of the path is determined to be unknown when at least one of the following conditions is met: a to-be-sent data packet is a data packet first sent on the path by a current host; or a PMTU entry that is of the path and that is on a current host is deleted; and
wherein performing PMTU probing on the path further comprises: sending a first probe packet according to a second MTU and a third MTU, wherein the second MTU is an MTU configured on a specific interface of the current host, the third MTU is an MTU indicated in a router advertisement (RA) packet that is received by the current host from the specific interface, and the specific interface is an egress interface used by the current host to send the to-be-sent data packet.

4. The method according to claim 1, wherein the PMTU of the path is determined to be unknown when a current host receives an indication message sent by a network device on the path, wherein the indication message is used to indicate that a packet received on the path by the network device is excessively long; and
wherein performing PMTU probing on the path further comprises: obtaining an MTU supported by the network device from the indication message, and sending a first probe packet in an ongoing PMTU probing process of the path according to the obtained MTU.

5. The method according to claim 1, wherein performing PMTU probing on the path further comprises:
determining whether the sent probe packet is received by a destination receive end of a to-be-sent data packet; and
using a maximum MTU of a respective probe packet received by the destination receive end as the PMTU of the path.

6. The method according to claim 5, wherein the probe packet is a transport layer protocol packet, wherein a destination port number of the probe packet is a port number that is not used by the destination receive end, and performing PMTU probing on the path comprises: after sending probe packet on the path, if a peer end unreachable packet is received, determining that the probe packet was received by the destination receive end.

7. The method according to claim 5, wherein the probe packet is a ping packet, and performing PMTU probing on the path comprises: after sending the probe packet on the path, if a response of the destination receive end is received, determining that the probe packet was received by the destination receive end.

8. The method according to claim 5, wherein the probe packet is a trace route packet, and performing PMTU probing on the path comprises: after sending the probe packet on the path, if a response of the destination receive end is received, determining that the probe packet was received by the destination receive end.

9. The method according to claim 5, wherein the probe packet is a protocol packet over a transport layer, and performing PMTU probing on the path comprises: after sending the probe packet on the path, if a response packet that is agreed in advance with a current host to respond to the probe packet and that is returned by the destination receive end is received, determining that the probe packet was received by the destination receive end.

10. A data packet sending apparatus in an Internet Protocol version 6 (IPv6) network, comprising:
a processor; and
a transceiver;
wherein the processor and the transceiver are configured to cooperate to facilitate:
determining that a path maximum transmission unit (PMTU) of a path is unknown;
after determining that the PMTU of the path is unknown and before the PMTU of the path is obtained successfully, sending one or more data packets on the path according to a minimum maximum transmission unit (MTU) stipulated in the IPv6 protocol to ensure the one or more data packets are small enough to pass through any network device having any MTU on the path, wherein the one or more data packets carry to-be-sent data;
performing PMTU probing on the path, wherein performing PMTU probing on the path comprises: constructing a probe packet by using a source IP address and a destination IP address, and sending the probe packet on the path; and
after the PMTU of the path is obtained successfully through the PMTU probing, sending one or more subsequent data packets on the path according to the PMTU of the path.

11. The apparatus according to claim 10, wherein the PMTU of the path is determined to be unknown when at least one of the following conditions is met:
a to-be-sent data packet is a data packet first sent on the path by a current host;
a PMTU entry that is of the path and that is on a current host is deleted;
a current host is probing the PMTU of the path; or
a current host receives an indication message sent by a network device on the path, wherein the indication message is used to indicate that a packet received on the path by the network device is excessively long.

12. The apparatus according to claim 10,
wherein the PMTU of the path is determined to be unknown when at least one of the following conditions is met: a to-be-sent data packet is a data packet first sent on the path by a current host or a PMTU entry that is of the path and that is on a current host is deleted; and
wherein performing PMTU probing on the path further comprises: sending a first probe packet according to a second MTU and a third MTU, wherein the second MTU is an MTU configured on a specific interface of the current host, the third MTU is an MTU indicated in a router advertisement (RA) packet that is received by the current host from the specific interface, and the specific interface is an egress interface used by the current host to send the to-be-sent data packet.

13. The apparatus according to claim 10, wherein the PMTU of the path is determined to be unknown when a current host receives an indication message sent by a network device on the path, wherein the indication message is used to indicate that a packet received on the path by the network device is excessively long; and
wherein performing PMTU probing on the path further comprises: obtaining an MTU supported by the network device from the indication message, and sending a first probe packet in an ongoing PMTU probing process of the path according to the obtained MTU.

14. The apparatus according to claim 10, wherein performing PMTU probing on the path further comprises:
determining whether the sent probe packet is received by a destination receive end of a to-be-sent data packet; and
if it is determined that the probe packet is received by the destination receive end, using a maximum MTU of a respective probe packet received by the destination receive end as the PMTU of the path.

15. The apparatus according to claim 14, wherein the probe packet is a transport layer protocol packet, wherein a destination port number of the probe packet is a port number that is not used by the destination receive end, and performing PMTU probing on the path further comprises: after sending the probe packet on the path, if a peer end unreachable packet is received, determining that the probe packet was received by the destination receive end.

16. The apparatus according to claim 14, wherein the probe packet is a ping packet, and performing PMTU probing on the path further comprises: after sending the probe packet on the path, if a response of the destination receive end is received, determining that the probe packet was received by the destination receive end.

17. The apparatus according to claim 14, wherein the probe packet is a trace route packet, and performing PMTU probing on the path further comprises: after sending the probe packet on the path, if a response of the destination receive end is received, determining that the probe packet is received by the destination receive end.

18. The apparatus according to claim 14, wherein the probe packet is a protocol packet over a transport layer, and performing PMTU probing on the path further comprises: after sending the probe packet on the path, if a response packet that is agreed in advance with a current host to respond to the probe packet and that is returned by the destination receive end is received, determining that the probe packet was received by the destination receive end.

19. The apparatus according to claim 10, wherein, when no indication message which indicates that a packet received by a network device on the path is excessively long is received for a continuous N times of transmission of the probe packet and when it cannot be determined that a destination receive end receives the probe packet, the PMTU probing is performed by using a dichotomy, wherein N is a positive integer, and wherein a layer 2 switch exists on the path.

20. A non-transitory computer-readable medium having processor-executable instructions stored thereon, wherein the processor-executable instructions, when executed, facilitate:
determining that a path maximum transmission unit (PMTU) of a path is unknown;
after determining that the PMTU of the path is unknown and before the PMTU of the path is obtained successfully, sending one or more data packets on the path according to a minimum maximum transmission unit (MTU) stipulated in the Internet Protocol version 6 (IPv6) protocol to ensure the one or more data packets are small enough to pass through any network device having any MTU on the path, wherein the one or more data packets carry to-be-sent data;
performing PMTU probing on the path, wherein performing PMTU probing on the path comprises: constructing a probe packet by using a source IP address and a destination IP address, and sending the probe packet on the path; and
after the PMTU of the path is obtained successfully through the PMTU probing, sending one or more subsequent data packets on the path according to the PMTU of the path.

* * * * *